United States Patent
Wang

(10) Patent No.: US 9,489,001 B2
(45) Date of Patent: Nov. 8, 2016

(54) CONSTANT ON-TIME OR CONSTANT OFF-TIME SWITCHING POWER CONVERTER AND CONTROL CIRCUIT THEREOF

(71) Applicant: Ko-Cheng Wang, Nantou (TW)

(72) Inventor: Ko-Cheng Wang, Nantou (TW)

(73) Assignee: RICHTEK TECHNOLOGY CORPORATION, Zhubei, Hsinchu (TW)

(*) Notice: Subject to any disclaimer, the term of this patent is extended or adjusted under 35 U.S.C. 154(b) by 0 days.

(21) Appl. No.: 14/735,176

(22) Filed: Jun. 10, 2015

(65) Prior Publication Data

US 2015/0362937 A1 Dec. 17, 2015

Related U.S. Application Data

(60) Provisional application No. 62/011,802, filed on Jun. 13, 2014.

(51) Int. Cl.
*H02M 3/156* (2006.01)
*G05F 1/575* (2006.01)
*H02M 1/08* (2006.01)
*H02M 3/157* (2006.01)

(52) U.S. Cl.
CPC ............... *G05F 1/575* (2013.01); *H02M 1/08* (2013.01); *H02M 3/156* (2013.01)

(58) Field of Classification Search
CPC ........ H02M 7/00; H02M 1/08; H02M 3/156; H02M 2001/0032; H02M 3/157; H02M 3/1588; H02M 2001/003; H02M 2001/0041; G05F 1/56

See application file for complete search history.

(56) References Cited

U.S. PATENT DOCUMENTS

| 6,476,589 B2 | 11/2002 | Umminger et al. | |
| 7,876,081 B2* | 1/2011 | Hachiya | H02M 3/156 323/284 |
| 2010/0301827 A1* | 12/2010 | Chen | H02M 3/156 323/299 |
| 2012/0133348 A1* | 5/2012 | Fan | H02M 3/1588 323/284 |
| 2012/0268969 A1* | 10/2012 | Cuk | H02M 7/48 363/17 |

* cited by examiner

*Primary Examiner* — Gary L Laxton
*Assistant Examiner* — Henry Lee, III
(74) *Attorney, Agent, or Firm* — Tung & Associates

(57) ABSTRACT

A constant ON-time or constant OFF-time switching power converter includes a control circuit for controlling a power switch. The control circuit includes: a constant ON-time or constant OFF-time calculation circuit, for calculating a constant ON-time or constant OFF-time; a logic circuit having inputs for receiving an output of the constant ON-time or constant OFF-time calculation circuit and a clock signal, respectively, wherein the clock signal has a frequency which is the desired fixed frequency; and a flip-flop for generating an output signal according to a set input and a reset input, wherein one of the set input and the reset input receives an output of the logic circuit, and the other one of the set input and the reset input receives a trigger signal which determines a start time of the ON-time or OFF-time.

12 Claims, 6 Drawing Sheets

CONSTANT ON-TIME OR CONSTANT OFF-TIME SWITCHING POWER CONVERTER AND CONTROL CIRCUIT THEREOF

CROSS REFERENCE

The present invention claims priority to U.S. 62/011,802, filed on Jun. 13, 2014.

BACKGROUND OF THE INVENTION

1. Field of Invention

The present invention relates to a constant ON-time or constant OFF-time switch power converter and a control circuit thereof; particularly, the present invention relates to such a constant ON-time or constant OFF-time switch power converter which can achieve fixed-frequency control without requiring a complicated phase lock loop (PLL), and a control circuit thereof.

2. Description of Related Art

FIG. 1 shows a conventional switching power converter. A power switch control circuit 11 controls at least one power switch (referring to FIGS. 2A-2H) within a power stage circuit 12, to convert an input voltage Vin to an output voltage Vout, and to provide an output current Iout when it is required by a load circuit (not shown). The power stage circuit 12 is for example but not limited to a synchronous or non-synchronous buck, boost, inverting, or buck-boost power conversion circuit as shown in FIGS. 2A-2H. Referring to FIG. 1, a feedback circuit 13 generates a feedback signal related to the output voltage Vout, and sends the feedback signal to the power switch control circuit 11, so that the power switch control circuit 11 controls the power stage circuit 12 according to the feedback signal to regulate the output voltage Vout or the output current Iout to a target.

Typically there are two control modes for the power switch control circuit 11 to control the power stage circuit 12, i.e., the fixed-frequency control mode and the variable-frequency control mode. As an example, assuming that the power stage circuit 12 is the non-synchronous buck power conversion circuit of FIG. 2B, FIG. 3A shows the waveform of the power switch gate signal in the fixed-frequency control mode, wherein in a heavy load condition (the load circuit consuming a relatively higher current), the ON-time of the power switch is ton1, whereas in a light load condition (the load circuit consuming a relatively lower current), the ON-time of the power switch is ton2. The cycle period is T, which is the same in both the heavy load condition and the light load condition, but the ON-time of the power switch changes in response to different load conditions. FIG. 3B shows the waveform of the power switch gate signal in a constant ON-time control mode of the variable-frequency control mode (also assuming that the power stage circuit 12 is the non-synchronous buck power conversion circuit of FIG. 2B), wherein the ON-time of the power switch is ton, which is the same in both the heavy load condition and the light load condition, but in the heavy load condition, the cycle period is T1 which is relatively shorter and the frequency is faster, whereas in the light load condition, the cycle period is T2 which is relatively longer and the frequency is slower, to respond to different load conditions. FIG. 3C shows the waveform of the power switch gate signal in a constant OFF-time control mode of the variable-frequency control mode (also assuming that the power stage circuit 12 is the non-synchronous buck power conversion circuit of FIG. 2B), wherein the OFF-time of the power switch is toff, which is the same in both the heavy load condition and the light load condition, but in the heavy load condition, the cycle period is T3 which is relatively longer and the frequency is slower (so the ON-time is relatively longer), whereas in the light load condition, the cycle period is T4 which is relatively shorter and the frequency is faster (so the ON-time is relatively shorter), to respond to different load conditions.

In the constant ON-time and OFF-time control modes of FIGS. 3B and 3C, although the ON-time or OFF-time of the power switch is a constant and the frequency is therefore variable, in many applications, it is preferred to properly set the ON-time or OFF-time so that the power switch operates by a fixed frequency. Still assuming that the power stage circuit 12 is the non-synchronous buck power conversion circuit of FIG. 2B, if the input voltage Vin and the output voltage Vout are both known, a proper duty ratio (which is equal to the ON-time divided by the cycle period) of the power switch can be determined according to the relationship between the output voltage Vout and the input voltage Vin; hence, under a given frequency, a proper ON-time or OFF-time can be calculated, and the power switch can operate by a fixed frequency (which is the given frequency) according to this calculated ON-time or OFF-time.

To achieve the aforementioned fixed-frequency control, the switching frequency of the power switch has to be first aligned to the given frequency, and then, as the power switch operates according to the calculated ON-time or OFF-time, the switching frequency of the power switch will naturally be locked to the given frequency. However, if the switching frequency of the power switch is not first aligned to the given frequency, although a proper ON-time or OFF-time is calculated, the power switch may not be able to operate by the desired fixed frequency. In the prior art, a typical solution to this is to provide a PLL to align the switching frequency of the power switch to the given frequency, such as in U.S. Pat. No. 6,476,589. However, a PLL is a complicated, high cost, and large size circuit.

In view of the above, the present invention proposes a constant ON-time or constant OFF-time switch power converter which can achieve fixed-frequency control without requiring a complicated phase lock loop (PLL), and a control circuit thereof.

SUMMARY OF THE INVENTION

From one perspective, the present invention provides a constant ON-time or constant OFF-time switching power converter, comprising: a power stage circuit including at least one power switch, for converting an input voltage to an output voltage by an operation of the power switch; a control circuit for generating a control signal to control the power switch, the control circuit including: a constant ON-time or constant OFF-time calculation circuit, for calculating a constant ON-time or constant OFF-time according to input voltage related information and output voltage related information, whereby when the power switch operates according to the constant ON-time or the constant OFF-time, the power switch operates by a fixed switching frequency; a logic circuit having inputs for receiving an output of the constant ON-time or constant OFF-time calculation circuit and a clock signal, respectively, wherein the clock signal has a frequency which is the fixed switching frequency; and a flip-flop for generating an output signal according to a set input and a reset input, the output signal determining an ON-time or an OFF-time of the power switch, wherein one of the set input and the reset input is coupled to an output of the logic circuit, and the other one of the set input and the reset input is coupled to a trigger signal which determines a start time of the ON-time or OFF-time of the power switch.

From another aspect, the present invention provides a control circuit for controlling a constant ON-time or constant OFF-time switching power converter, the switching power converter including a power stage circuit which includes at least one power switch, for converting an input voltage to an output voltage by an operation of the power switch, the control circuit generating a control signal to control the power switch, the control circuit comprising: a constant ON-time or constant OFF-time calculation circuit, for calculating a constant ON-time or constant OFF-time according to input voltage related information and output voltage related information, whereby when the power switch operates according to the constant ON-time or the constant OFF-time, the power switch operates by a fixed switching frequency; a logic circuit having inputs for receiving an output of the constant ON-time or constant OFF-time calculation circuit and a clock signal, respectively, wherein the clock signal has a frequency which is the fixed switching frequency; and a flip-flop for generating an output signal according to a set input and a reset input, the output signal determining an ON-time or an OFF-time of the power switch, wherein one of the set input and the reset input is coupled to an output of the logic circuit, and the other one of the set input and the reset input is coupled to a trigger signal which determines a start time of the ON-time or OFF-time of the power switch.

In one embodiment, before the switching frequency of the power switch is aligned to the fixed switching frequency, the frequency of the clock signal is faster than the switching frequency of the power switch.

In one embodiment, after the power switch operates by fixed switching frequency, the power switch operates by a duty ratio which is higher than 50%.

In one embodiment, the control circuit further includes a comparator for comparing a feedback signal related to the output voltage with a reference signal to generate the trigger signal.

In one embodiment, the control circuit further includes: an error amplifier for comparing a feedback signal related to the output voltage with a reference signal to generate an error amplified signal; and a comparator for making a comparison according to the error amplified signal with a current sense signal related to an inductor current in the power stage circuit to generate the trigger signal.

In one embodiment, the error amplified signal is compensated to generate a slop-compensated error amplified signal, and the comparator compares the slop-compensated error amplified signal with the current sense signal to generate the trigger signal.

In one embodiment, the current sense signal is compensated to generate a slop-compensated current sense signal, and the comparator compares the slop-compensated current sense signal with the error amplified signal to generate the trigger signal.

The objectives, technical details, features, and effects of the present invention will be better understood with regard to the detailed description of the embodiments below.

DESCRIPTION OF THE PREFERRED EMBODIMENTS

Figure 1:
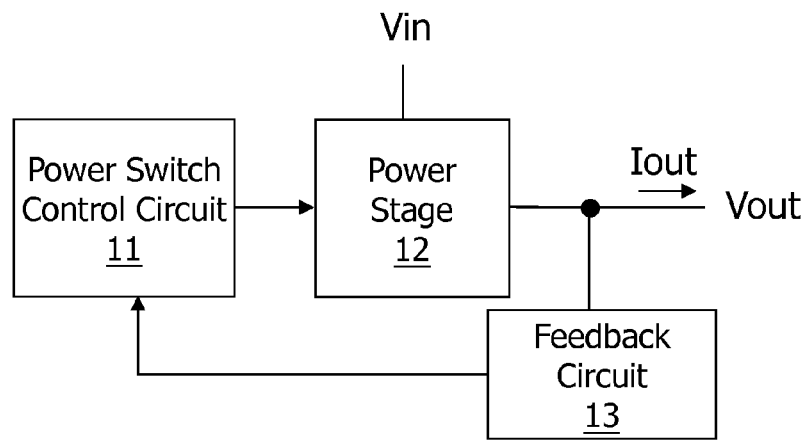
FIG. 1 shows a conventional switching power converter.
Figure 2A:
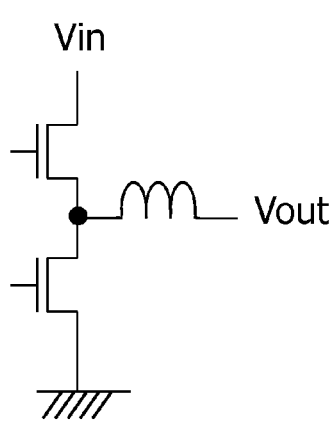
FIGS. 2A-2H show synchronous and non-synchronous buck, boost, inverting, or buck-boost power conversion circuits, respectively.
Figure 2B:
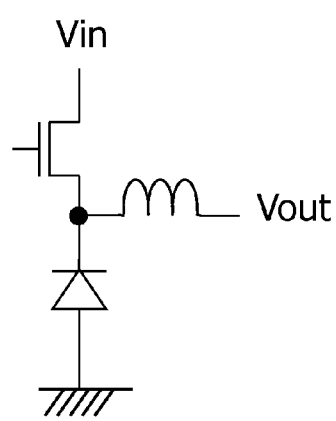
Figure 2C:
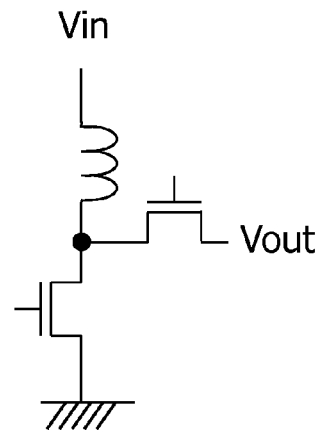
Figure 2D:
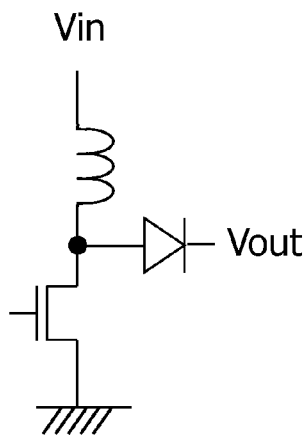
Figure 2E:
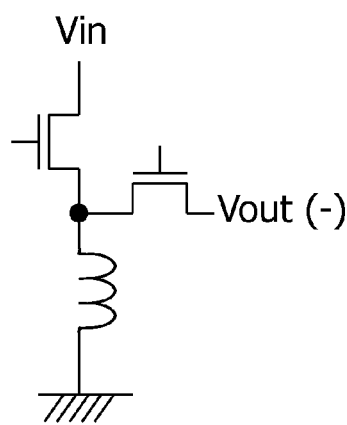
Figure 2F:
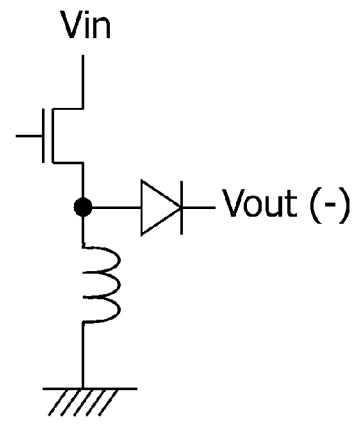
Figure 2G:
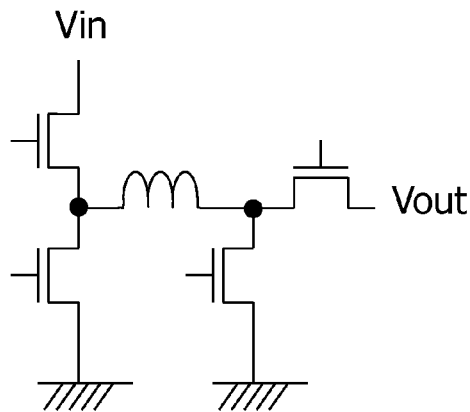
Figure 2H:
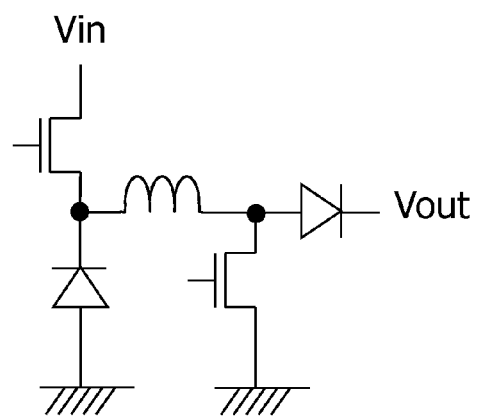
Figure 3A:
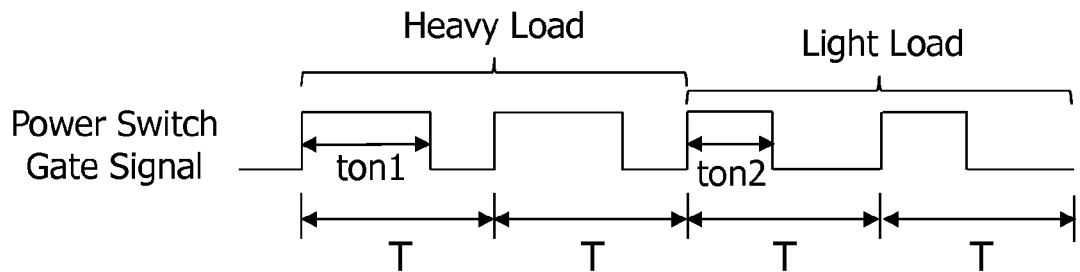
FIG. 3A shows the waveform of the power switch gate signal in the fixed-frequency control mode.
Figure 3B:
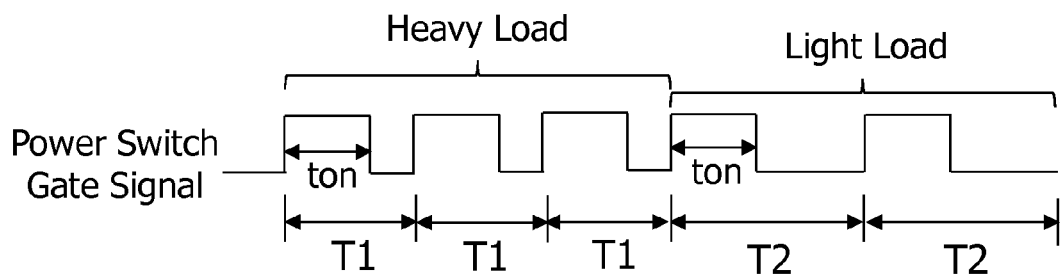
FIG. 3B shows the waveform of the power switch gate signal in a constant ON-time control mode of the variable-frequency control mode.
Figure 3C:
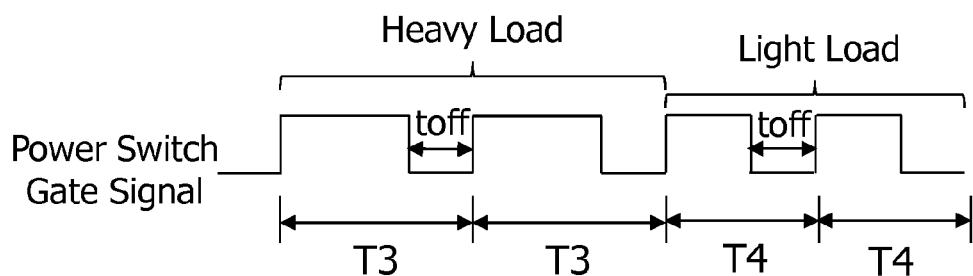
FIG. 3C shows the waveform of the power switch gate signal in a constant OFF-time control mode of the variable-frequency control mode.
Figure 4:
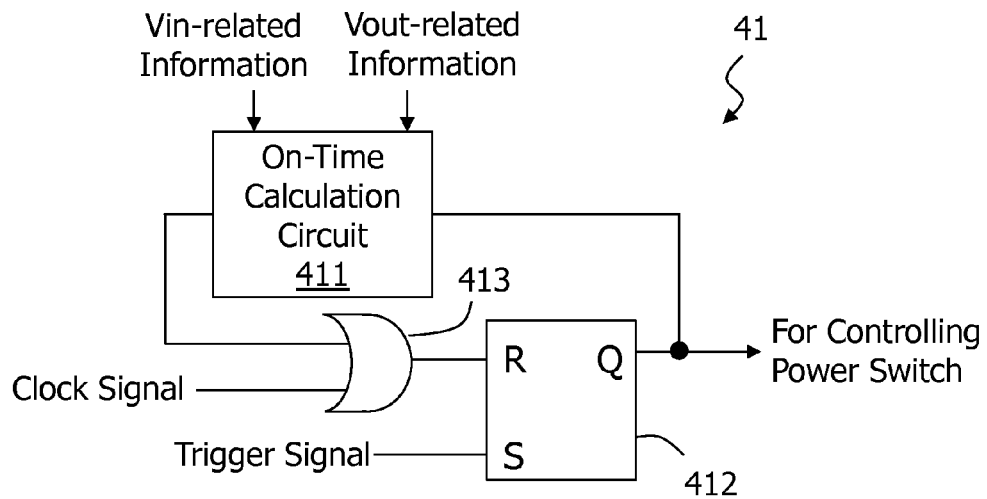
FIG. 4 shows an embodiment of a control circuit of a switching power converter according to the present invention.

Please refer to FIG. 4, which shows an embodiment of a control circuit of a switching power converter according to the present invention. This embodiment illustrates a control circuit which is applied to a constant ON-time control mode, but as will be understood from other embodiments to be explained later, the present invention can be applied to a constant OFF-time control mode as well. The control circuit 41 in FIG. 4 replaces the power switch control circuit 11 in FIG. 1, to control at least one power switch within the power stage circuit 12. As shown in FIG. 4, the control circuit 41 includes an ON-time calculation circuit 411, a flip-flop 412, and a logic circuit 413. The ON-time calculation circuit 411 calculates a proper ON-time according to input voltage related information and output voltage related information, so that when the power switch operates according to this proper ON-time, the switching frequency can be fixed. The ON-time calculation circuit 411 can calculate the proper ON-time according to input voltage related information and output voltage related information by any known method, such as the method disclosed in U.S. Pat. No. 8,531,166 which is assigned to the same assignee of the present invention, and is not redundantly explained here.

The output signal Q of the flip-flop 412 is used for controlling the operation of the power switch. Depending on the operation levels of the power switch and the levels of the output signal Q, a driver gate may be (but is not necessarily) required to convert the levels of the output signal Q to proper levels for driving the gate of the power switch.

The start time of the high level of the output signal Q is determined by the set input S of the flip-flop 412, and the end time of the high level of the output signal Q is determined by the reset input R of the flip-flop 412. In this embodiment, it is assumed that the high level of the output signal Q determines the ON-time of the power switch. If it is the low level of the output signal Q that determines the ON-time of the power switch, then the connections of the set input S and the reset input R of the flip-flop 412 can be rearranged correspondingly.

The set input S of the flip-flop 412 receives a trigger signal, to determine the start time of the ON-time of the power switch. This trigger signal indicates that the output voltage Vout drops lower than a predetermined level, and therefore it is required to transmit power from the input voltage Vin to the output voltage Vout. Several examples as to how the trigger signal is generated will be explained later, but it should be noted that there are different ways to generate the trigger signal for different types of switching power converters, and the present invention is not limited to any specific way to generate the trigger signal.

One of the features of the present invention is in that the control circuit 41 includes a logic circuit 413 having inputs which receive the output of the ON-time calculation circuit 411 and a clock signal, respectively; the frequency of the clock signal is the desired fixed frequency. The output of the logic circuit 413 is coupled to the reset input R of the flip-flop 412, to determine the end time of the ON-time of the power switch. Thus, the present invention can align the switching frequency of the power switch to the desired fixed frequency without a PLL. The logic circuit 413 is shown as an OR gate as an example in this embodiment, under the assumption that both the output of the ON-time calculation circuit 411 and the clock signal use high levels as the activation level; if the meanings of the high and low levels of the clock signal or the output of the ON-time calculation circuit 411 are arranged differently, the logic circuit 413 can be designed correspondingly.

As the ON-time calculation circuit 411 calculates the ON-time according to input voltage related information and output voltage related information, the ON-time calculation circuit 411 will delay the ON-time from a rising edge of the output signal Q of the flip-flop 412 (assuming that the high level of the output signal Q is the ON-time of the power switch), and then sends an output signal to reset the reset input R of the flip-flop 412. However, if the clock signal resets the reset input R of the flip-flop 412 before the output signal of the ON-time calculation circuit 411 resets the reset input R of the flip-flop 412, it means that the frequency of the clock signal is faster and/or the phase of the clock signal is earlier, and this will reduce the ON-time whereby the power transmitted from the input voltage Vin to the output voltage Vout is reduced, and accordingly the next trigger signal will be earlier. Thus, after a period of time, the output signal Q of the flip-flop 412 will naturally be aligned to the frequency and phase of the clock signal.

The above also implies that, before the switching frequency of the power switch is aligned to the desired frequency, if the frequency of the clock signal is deliberately made faster than the switching frequency of the power switch, it can align the switching frequency of the power switch to the desired frequency faster and more smoothly (relatively to the case wherein the frequency of the clock signal is slower than the switching frequency of the power switch).

Figure 5:
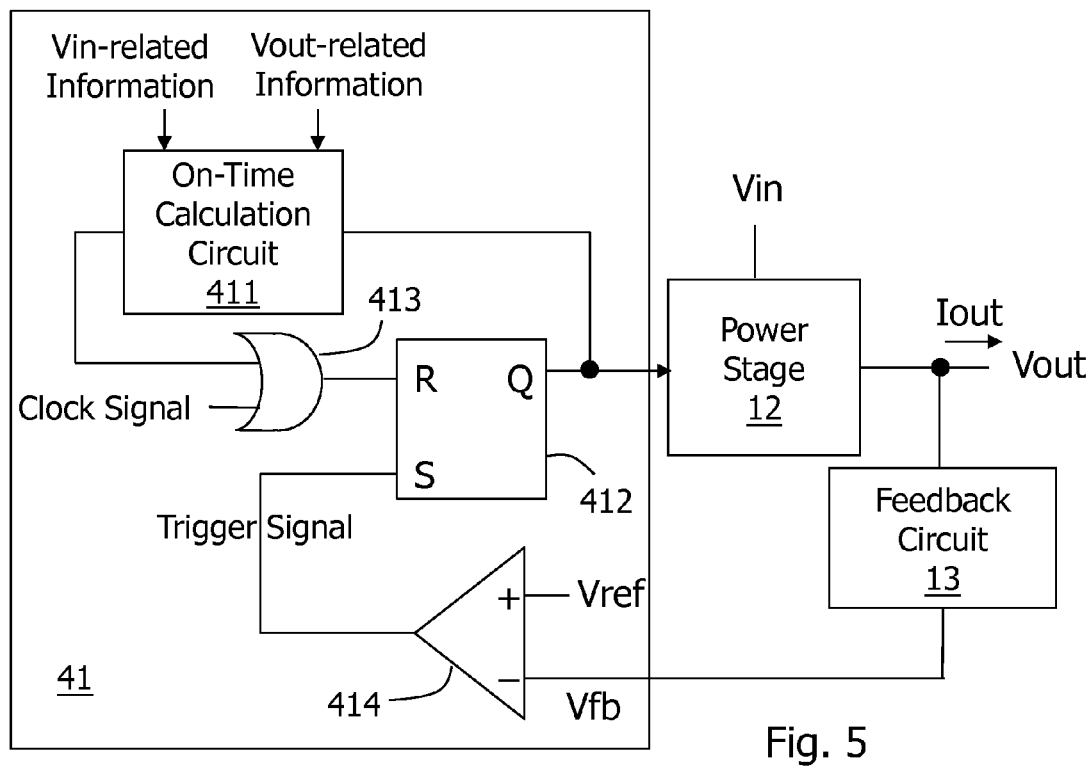
FIG. 5 shows an embodiment of a switching power converter according to the present invention.

FIG. 5 shows an embodiment of a switching power converter according to the present invention, which shows one way to generate the trigger signal. As shown in the figure, in this embodiment, the control circuit 41 further includes a comparator 414, in addition to the ON-time calculation circuit 411, the flip-flop 412, and the logic circuit 413. The comparator 414 compares a feedback signal Vfb related to the output voltage Vout with a reference signal Vref. When the feedback signal Vfb is lower than or equal to the reference signal Vref, it means that the output voltage Vout drops too low, and the trigger signal is generated to turn ON the power switch.

Figure 6:
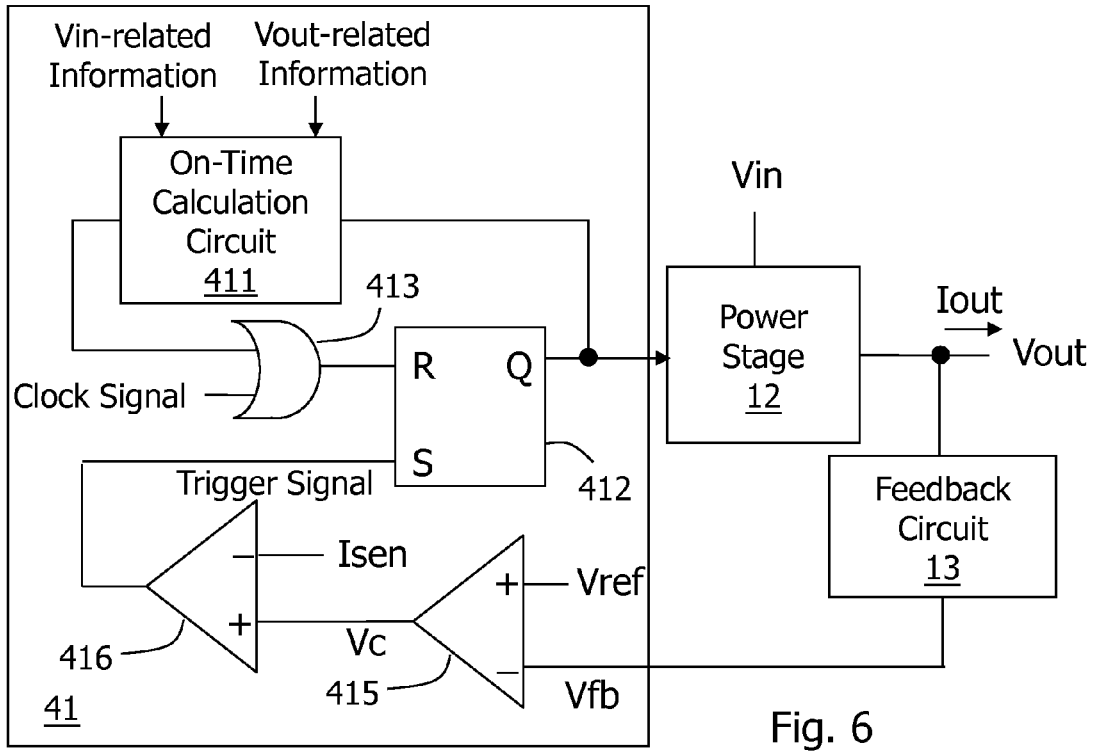
FIG. 6 shows another embodiment of a switching power converter according to the present invention.

FIG. 6 shows another embodiment of a switching power converter according to the present invention, which shows another way to generate the trigger signal. As shown in the figure, in this embodiment, the control circuit 41 further includes an error amplifier 415 and a comparator 416, in addition to the ON-time calculation circuit 411, the flip-flop 412, and the logic circuit 413. The error amplifier 415 compares a feedback signal Vfb related to the output voltage Vout with a reference signal Vref to generate an error amplified signal Vc. The comparator 416 compares the error amplified signal Vc with a current sense signal Isen, wherein the current sense signal Isen relates to an inductor current in the power stage circuit 12. When the error amplified signal Vc is lower than or equal to the current sense signal Isen, it means that the output voltage Vout drops too low, and the trigger signal is generated to turn ON the power switch.

Figure 7A:
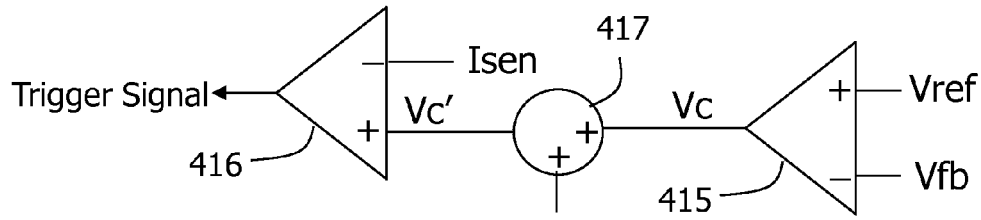
FIGS. 7A-7B show two embodiments as to how to perform slope compensation.
Figure 7B:
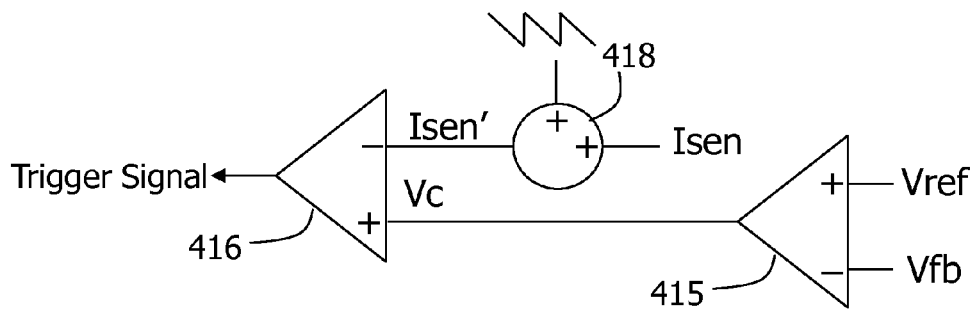

Please refer to FIGS. 7A-7B. In certain applications, if the duty ratio of the power switch is lower than 50%, certain abnormal disturbances (such as transient deviations of the inductor current or the output voltage, or transient noises in the related electronic signals) may not be able to converge and the circuit may become unstable. This problem can be solved by slope compensation. FIGS. 7A-7B show two embodiments as to how to perform slope compensation. In FIG. 7A, a slope compensation circuit 417 adds the error amplified signal Vc with a ramp signal having a positive slope to generate a slope compensated error amplified signal Vc', which is sent to the comparator 416 to be compared with the current sense signal Isen. In FIG. 7B, a slope compensation circuit 418 adds the current sense signal Isen with a ramp signal having a negative slope to generate a slope compensated current sense signal Isen', which is sent to the comparator 416 to be compared with the error amplified signal Vc. By slope compensation, even if the duty ratio of the power switch is lower than 50% and certain abnormal disturbances occur, the abnormal disturbances can converge in the feedback control process. And if the duty ratio of the power switch is higher than 50%, the abnormal disturbances can converge in the feedback control process without slope compensation.

Figure 8:
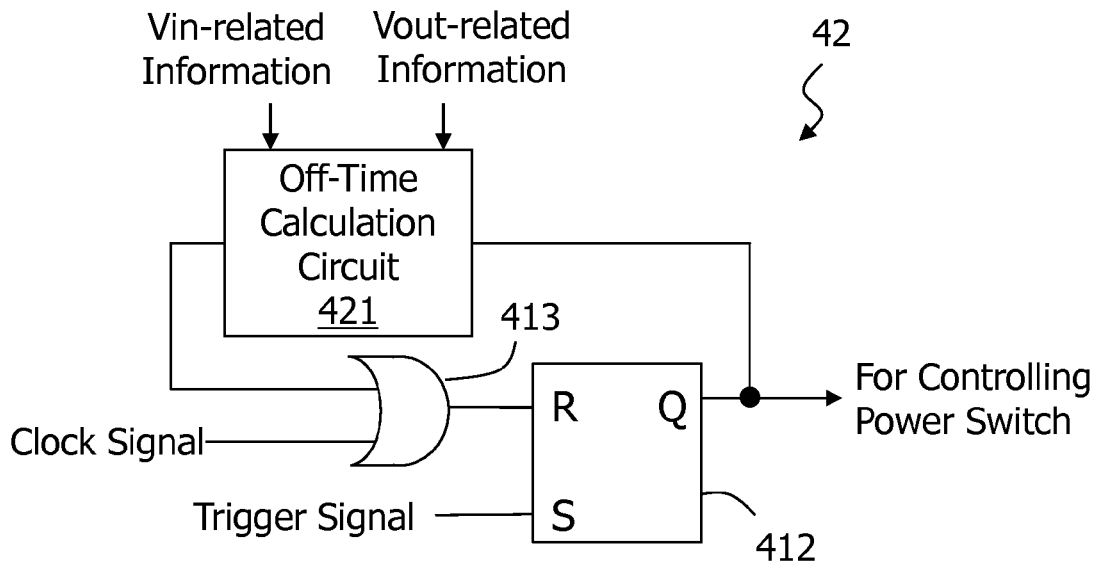
FIG. 8 shows another embodiment of a control circuit of a switching power converter according to the present invention.

Please refer to FIG. 8. As described in the above, the present invention also can be applied to constant OFF-time control. In the embodiment of FIG. 8, the control circuit 42 includes an OFF-time calculation circuit 421, a flip-flop 412, and a logic circuit 413. The OFF-time calculation circuit 421 calculates a proper OFF-time according to input voltage related information and output voltage related information, so that when the power switch operates according to this proper OFF-time, the switching frequency can be fixed.

The output signal Q of the flip-flop 412 is used for controlling the operation of the power switch. The start time of the high level of the output signal Q is determined by the set input S of the flip-flop 412, and the end time of the high level of the output signal Q is determined by the reset input R of the flip-flop 412. In this embodiment, it is assumed that the high level of the output signal Q determines the OFF-time of the power switch. The set input S of the flip-flop 412 receives a trigger signal, to determine the start time of the OFF-time of the power switch. The logic circuit 413 receive the output of the OFF-time calculation circuit 421 and a clock signal by its two inputs, respectively; the frequency of the clock signal is the desired fixed frequency. The output of the logic circuit 413 is coupled to the reset input R of the flip-flop 412, to determine the end time of the OFF-time of the power switch. Similar to the constant ON-time control described in the above, if the clock signal resets the reset input R of the flip-flop 412 before the output signal of the OFF-time calculation circuit 421 resets the reset input R of the flip-flop 412, it means that the frequency of the clock signal is faster and/or the phase of the clock signal is earlier, and this will reduce the OFF-time whereby the power transmitted from the input voltage Vin to the output voltage Vout is relatively higher, and accordingly the next trigger signal will be earlier. Thus, after a period of time, the output signal Q of the flip-flop 412 will naturally be aligned to the frequency and phase of the clock signal.

Figure 9:
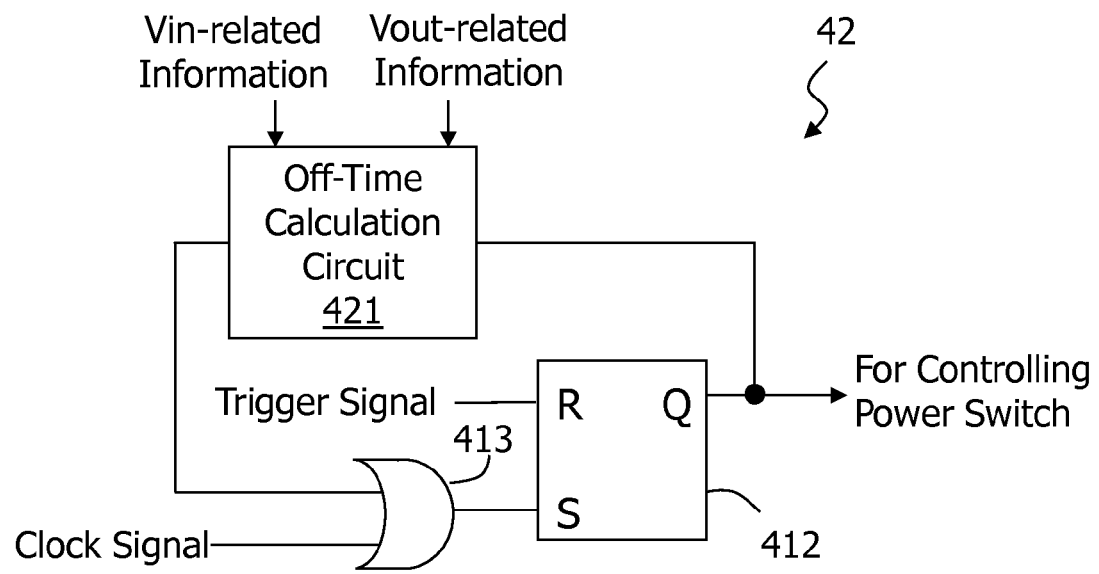
FIG. 9 shows another embodiment of a control circuit of a switching power converter according to the present invention.

In fact, it can be seen by comparing FIG. 8 with FIG. 4 that the two embodiments basically have the same circuit configuration, except that the ON-time calculation circuit 411 is replaced by the OFF-time calculation circuit 421. Moreover, referring to FIG. 9, if the low level of the output signal Q is defined as the OFF-time of the power switch, then the circuit can be modified as shown, which produces an equivalent effect. That is, depending on the definitions of the high and low levels, the connections of the set input S and reset input R of the flip-flop 412 and design of the logic gate 413 can be arranged correspondingly.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. In view of the foregoing, the spirit of the present invention should cover all such and other modifications and variations, which should be interpreted to fall within the scope of the following claims and their equivalents.

What is claimed is:

1. A constant ON-time or constant OFF-time switching power converter, comprising:
    a power stage circuit including at least one power switch, for converting an input voltage to an output voltage by an operation of the power switch;
    a control circuit for generating a control signal to control the power switch, the control circuit including:
        a constant ON-time or constant OFF-time calculation circuit, for calculating a constant ON-time or constant OFF-time according to input voltage related information and output voltage related information, whereby when the power switch operates according to the constant ON-time or the constant OFF-time, the power switch operates by a fixed switching frequency;
        a logic circuit having inputs for receiving an output of the constant ON-time or constant OFF-time calculation circuit and a clock signal, respectively, wherein the clock signal has a frequency which is the fixed switching frequency; and
    a flip-flop for generating an output signal according to a set input and a reset input, the output signal determining an ON-time or an OFF-time of the power switch, wherein one of the set input and the reset input is coupled to an output of the logic circuit, and the other one of the set input and the reset input is coupled to a trigger signal which determines a start time of the ON-time or OFF-time of the power switch;
    wherein before the switching frequency of the power switch is aligned to the fixed switching frequency, the frequency of the clock signal is faster than the switching frequency of the power switch.

2. The constant ON-time or constant OFF-time switching power converter of claim 1, wherein after the power switch operates by fixed switching frequency, the power switch operates by a duty ratio which is higher than 50%.

3. The constant ON-time or constant OFF-time switching power converter of claim 1, wherein the control circuit further includes a comparator for comparing a feedback signal related to the output voltage with a reference signal to generate the trigger signal.

4. The constant ON-time or constant OFF-time switching power converter of claim 1, wherein the control circuit further includes:
    an error amplifier for comparing a feedback signal related to the output voltage with a reference signal to generate an error amplified signal; and
    a comparator for making a comparison according to the error amplified signal with a current sense signal related to an inductor current in the power stage circuit to generate the trigger signal.

5. The constant ON-time or constant OFF-time switching power converter of claim 4, wherein the error amplified signal is compensated to generate a slope-compensated error amplified signal, and the comparator compares the slope-compensated error amplified signal with the current sense signal to generate the trigger signal.

6. The constant ON-time or constant OFF-time switching power converter of claim 4, wherein the current sense signal is compensated to generate a slope-compensated current sense signal, and the comparator compares the slope-compensated current sense signal with the error amplified signal to generate the trigger signal.

7. A control circuit for controlling a constant ON-time or constant OFF-time switching power converter, the switching power converter including a power stage circuit which includes at least one power switch, for converting an input voltage to an output voltage by an operation of the power switch, the control circuit generating a control signal to control the power switch, the control circuit comprising:
    a constant ON-time or constant OFF-time calculation circuit, for calculating a constant ON-time or constant OFF-time according to input voltage related information and output voltage related information, whereby when the power switch operates according to the constant ON-time or the constant OFF-time, the power switch operates by a fixed switching frequency;
    a logic circuit having inputs for receiving an output of the constant ON-time or constant OFF-time calculation circuit and a clock signal, respectively, wherein the clock signal has a frequency which is the fixed switching frequency; and
    a flip-flop for generating an output signal according to a set input and a reset input, the output signal determining an ON-time or an OFF-time of the power switch, wherein one of the set input and the reset input is coupled to an output of the logic circuit, and the other one of the set input and the reset input is coupled to a trigger signal which determines a start time of the ON-time or OFF-time of the power switch;
    wherein before the switching frequency of the power switch is aligned to the fixed switching frequency, the frequency of the clock signal is faster than the switching frequency of the power switch.

8. The control circuit of claim 7, wherein after the power switch operates by fixed switching frequency, the power switch operates by a duty ratio which is higher than 50%.

9. The control circuit of claim 7, wherein the control circuit further includes a comparator for comparing a feedback signal related to the output voltage with a reference signal to generate the trigger signal.

10. The control circuit of claim 7, wherein the control circuit further includes:
   an error amplifier for comparing a feedback signal related to the output voltage with a reference signal to generate an error amplified signal; and
   a comparator for making a comparison according to the error amplified signal with a current sense signal related to an inductor current in the power stage circuit to generate the trigger signal.

11. The control circuit of claim 10, wherein the error amplified signal is compensated to generate a slope-compensated error amplified signal, and the comparator compares the slope-compensated error amplified signal with the current sense signal to generate the trigger signal.

12. The control circuit of claim 7, wherein the current sense signal is compensated to generate a slope-compensated current sense signal, and the comparator compares the slope-compensated current sense signal with the error amplified signal to generate the trigger signal.

* * * * *